(No Model.) 2 Sheets—Sheet 1.
J. SCHWEIZER.
PIVOT LATHE.
No. 446,211. Patented Feb. 10, 1891.
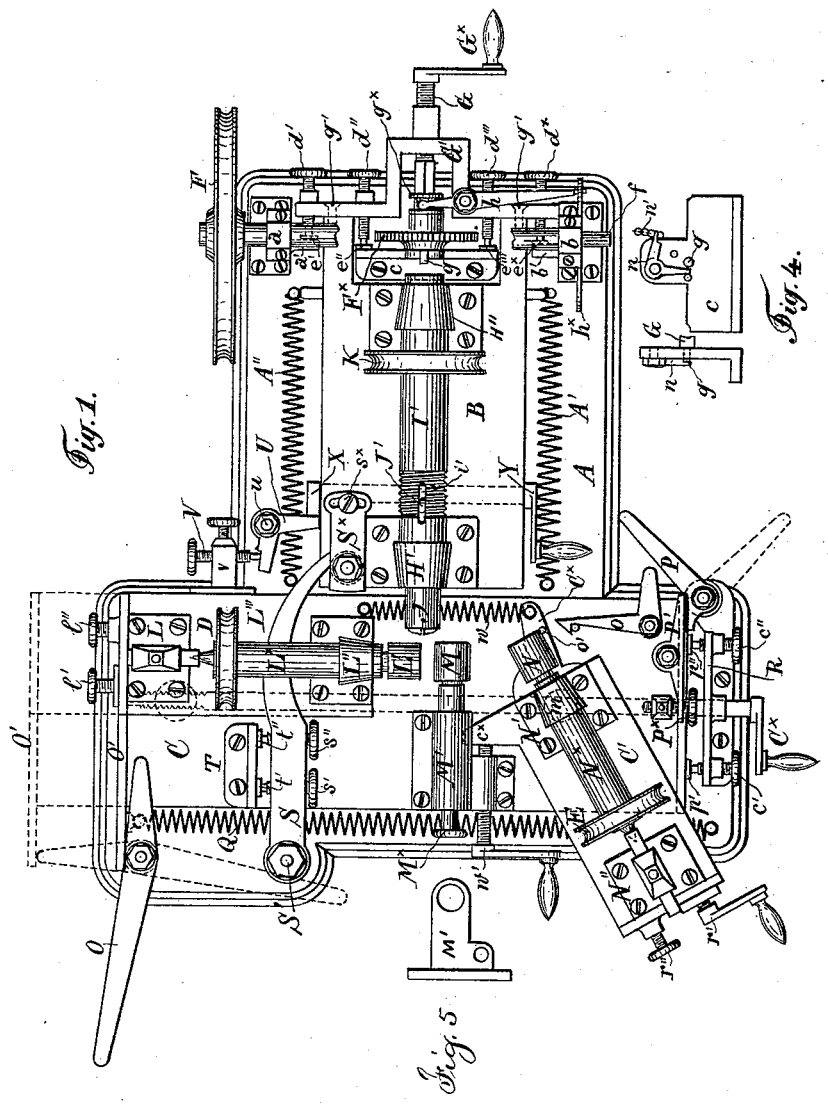
Witnesses
Chas. H. Smith
J. Staib
Inventor
Jakob Schweizer
per Lemuel W. Serrell
atty (No Model.) 2 Sheets—Sheet 2.
J. SCHWEIZER.
PIVOT LATHE.
No. 446,211. Patented Feb. 10, 1891.
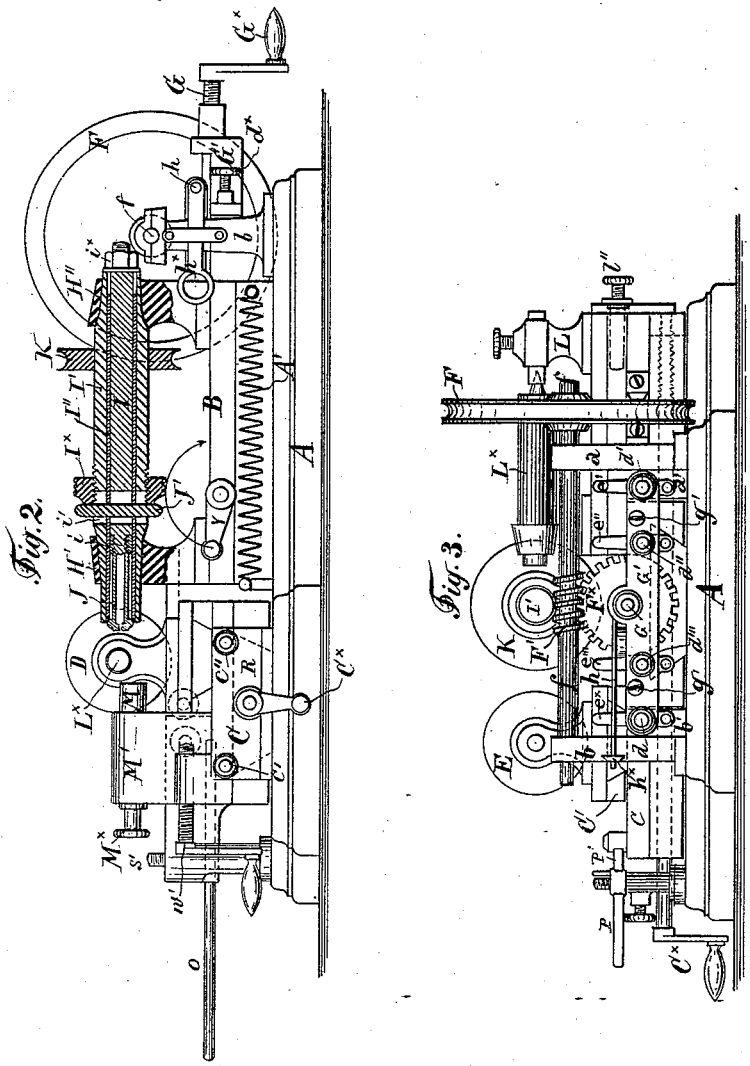

UNITED STATES PATENT OFFICE.

JAKOB SCHWEIZER, OF ZURICH, ASSIGNOR TO MULLER & SCHWEIZER, OF TOLOTHWIN, SWITZERLAND.

PIVOT-LATHE.

SPECIFICATION forming part of Letters Patent No. 446,211, dated February 10, 1891.

Application filed October 6, 1890. Serial No. 367,195. (No model.)

*To all whom it may concern:*

Be it known that I, JAKOB SCHWEIZER, engineer, of Zurich, Switzerland, have invented certain new and useful Improvements in Pivot-Lathes, of which the following is a specification.

This pivot-lathe is not only devised to form and polish the so-called "pivots" of moving parts employed in clock-works, musical boxes, and analogous mechanisms, but also to form the other cylindrical parts and the shoulders of the arbors of these moving parts, as well as their bevels and rounded parts. This machine produces with great rapidity and perfect accuracy pivots and shoulders having an irreproachable polish. It therefore permits of the interchangeability of the moving parts employed in each class of mechanism, the part made by its means being in no respect inferior to those made by the best workmen. Besides this, the manner of operating the machine prevents the breakage of very small pivots, so frequent in hand-work.

In the annexed drawings, Figure 1 is a plan of the machine with some parts removed for greater clearness. Fig. 2 is a side elevation partially in section, and Fig. 3 is an end elevation seen from the right of Fig. 1 with some parts removed for greater clearness. Fig. 4 shows, separately, the automatic disengaging mechanism hereinafter described; and Fig. 5 is a detached view of the bracket M′.

On a base A are arranged two main carriages B and C, whose slides are perpendicular the one to the other. The carriage B carries the work, and the carriage C carries the devices for polishing the work. The pulleys D, E, and F are connected with corresponding driving-pulleys on a shaft with a fast pulley driven by the power and a loose pulley onto which the strap or belt is shifted automatically when the work is finished by the disengaging mechanism hereinafter described.

The base A carries two bearings $a$ and $b$, in which turns the shaft $f$, carrying the pulley F and the worm F′. The bearings $a$ $b$ have projections $a'$ $b'$, serving as stops for the set-screws $d$ $d^\times$, carried by the cross-bar G′, which latter is fixed by means of screws $g'$ to the carriage N. The base A also carries a fixed support $c$ within the opening containing the carriage B, and against which support the set-screws $d^2$ $d^3$ of the cross-bar G′ abut. The stops $a'$ $b'$ and support $c$ are formed with holes allowing free passage to the screws $d'$ $d^2$ $d^3$ $d^\times$ when the tongue-pieces $e'$ $e^2$ $e^3$ $e^\times$ are shifted; but these tongue-pieces prevent their entrance when occupying the position shown in Fig. 3. According to the position into which the screws $d'$ $d^2$ $d^3$ $d^\times$ will have been placed, it will be one or other of them which will first encounter the corresponding tongue-piece $e'$ $e^2$ $e^3$ $e^\times$ when the carriage B moves from right to left. When this takes place, the carriage is stopped; but if the tongue-piece be shifted or displaced so as to uncover the hole it protects, the corresponding screw is able to enter this hole, and the carriage will continue its travel until the next most prominent screw meets its tongue-piece, which must then be shifted or displaced in its turn, and so on in succession, the four screws $a'$ $a^2$ $a^3$ $a^\times$ corresponding, for instance, to four shoulders which it is required to produce on the work. The carriage B is moved from right to left by the spiral springs A′ A², one end of each being connected to the base A and the other ends to the carriage B.

G is a spindle, a portion of which is screw-threaded and passes through the cross-bar G′. The remaining portion is square, and its end is provided with a pin $g$, traversing and slightly passing beyond the surface of the fixed piece $c$. The screw-spindle G may be turned by means of the crank-handle G$^\times$, and the carriage B can thereby be manipulated. By turning the spindle G to the right the carriage B is moved from left to right and the springs A′ A² become stretched. When, therefore, the spindle G is turned to the left, these springs are permitted to contract, and thus bring back the carriage B from right to left until one of the screws $d'$ $d^2$ $d^3$ $d^\times$ encounters its stop. This spindle G is ordinarily driven by the worm-wheel F$^\times$ gearing with the worm F′, the axis of which latter carries the pulley F. The wheel F$^\times$ is mounted loose on said spindle G and transmits motion thereto by means of a coupling-box $g^\times$, which may be thrown into or out of gear by means of the lever $h$, actuated by a bolt $h^\times$, carried by the fixed bearing $b$. It is thus possible to give motion to or stop the carriage B by shifting the bolt $h^\times$. When the coupling-box $g^\times$ is thrown out of gear, the backward movement of the carriage can be effected by hand by turning the crank-handle $G^\times$ to the right, or the springs $A'$ $A^2$ may be permitted to draw the carriage to the left by turning the crank-handle $G^\times$ to the left. In any case the carriage will be stopped whenever one of the screws $d'$, $d^2$, $d^3$, or $d^\times$ meets its abutment—that is to say, one of the tongue-pieces $e'$, $e^2$, $e^3$, or $e^\times$. When this meeting takes place and the spindle G continues turning, (either by means of the crank-handle $G^\times$ or by means of the pulley F,) the pin $g$, which, as already stated, passes beyond the surface of the fixed piece $c$, will be withdrawn to the right, together with the spindle G.

A small bell-crank lever $n$ is pivoted to the fixed piece $c$, (see Fig. 4,) having its vertical arm bearing against the projecting part of the pin $g$ and its horizontal arm connected to a chain communicating with the fork-lever of the intermediate gearing. This latter is provided with a disengaging-fork, which a spring tends to bring into a position for keeping the strap on the loose pulley. The chain above mentioned acts, on the contrary, to bring the fork into a position for placing the strap or the fast pulley of the gearing whenever this chain is hooked onto the horizontal arm of the bell-crank lever $n$. Thus when the chain $n'$ is hooked onto the horizontal arm of $n$ the driving-pulleys are started; but when the pin $g$ is withdrawn and the vertical arm of $n$ is disengaged therefrom the bell-crank lever $n$ turns in such a way as to slacken the chain $n'$, and the driving-pulleys are automatically stopped, as well as all the pulleys of the machine which are actuated thereby, and it will be seen from the preceding that this automatic stopping is effected by the encounter of one of the screws $d'$, $d^2$, $d^3$, or $d^\times$ with its corresponding stop $e'$, $e^2$, $e^3$, or $e^\times$.

The carriage B carries the bearings $H'$ $H'$, in which the hollow spindle $I'$, having conical ends, freely revolves. This latter contains a tube $I^2$, fitting onto $I'$ with slight friction and containing a spindle I, also fitting with slight friction. The interior spindle I is provided with a screw-thread $i$, onto which is fitted a spring-chuck J, known as an "American chuck," whose conical head may be more or less compressed by the interior cone with which the extremity of the tube $I^2$ is furnished. The chuck J thus opens when the spindle is moved from right to left, Fig. 2, and closes when the spindle is drawn backwardly from left to right, Fig. 2. A nut $i^\times$ enables the position of the interior spindle I to be adjusted in relation to $I'$. These two latter are traversed by an elongated slot $i'$, Figs. 1 and 2, through which passes a key $J'$, carried by the tube $I^2$. This key prevents any rotation of the spindles I, $I'$, and $I^2$ relatively to each other, but permits of the tubular spindle $I^2$ being shifted axially in relation to the spindles I $I'$. A nut $I^\times$ screws upon the threaded portion of $I'$ and forces the key $J'$ to the left when the nut $I^\times$ is turned in one direction. Hence the tubular spindle $I^2$ presses its conical portion against the exterior conical portion of J, thereby contracting the chuck. When the nut $I^\times$ is unscrewed, the conical portion of the chuck J forces the tube $I^2$ backward as far as the key $J'$ and nut $I^\times$ will permit. By screwing up or unscrewing the nut $I^\times$ the chuck J is accordingly closed or opened. The spindle $I'$ carries a pulley K, driven by the intermediate pulleys before mentioned, so that the work carried by the chuck J turns continuously as soon as the machine is set in motion.

The carriage C carries the cutters $L'$ and N and the burnisher M, which are arranged to act alternately upon the work, or, if required in special cases, there may be other tools on the carriage C. The cutter $L'$ is carried by an axis $L^\times$, driven by a pulley D and turning in bearings L $L^2$, fixed upon a carriage $L^3$, whose slide-block is upon the bed C. The cutter N is carried by an axis $N^\times$, driven by a pulley E and turning in bearings $N'$ $N^2$ upon a small carriage $C'$, whose slide-block is connected to the bed C by a pivot $m$. (Shown by dotted lines in Fig. 1.) A spiral spring $w$, fixed at one end of a nose $c^\times$ on the slide-block and at the other end to the carriage C, maintains the nose or projection $c^\times$ of the small carriage $C'$ pressed against a set-screw $w'$, which traverses a support fixed on the carriage C. By screwing up or unscrewing $w'$ the inclination of the axis of the cutter N may be altered relatively to the axis of the chuck J; or, in other words, relatively to the work. This arrangement is for the purpose of cutting the points, the bevels of the pivots, &c. The burnisher M is carried by an axis $M^\times$, turning in a bearing $M'$, fixed on the carriage C. The axis $M^\times$ is manipulated by means of a simple knob, the burnisher being unable to turn continuously, but only able to shift relatively to the work, as is done in straight-hand burnishers. In the drawings, Fig. 1, this latter is supposed to be actuated by the cutter L, which is in position for working. The carriage $L^3$ of the cutter L is actuated by the set-screws $l'$ $l^2$. The carriage C is actuated by the spiral spring Q, fixed at one end to this carriage and at the other end to the base A. A support R, fixed on this latter, carries two set-screws $c'$ $c^2$, against which the carriage C is pressed by the spring Q. The end in question of the carriage is furnished with tongue-pieces $p'$ $p^2$, like the tongue-pieces before mentioned. These tongue-pieces permit the screws $c'$ $c^2$ to act successively in a similar manner to that already described with reference to the screws $d'$, $d^2$, $d^3$, and $d^\times$. When the longest of these two screws $c'$ $c^2$ encounters its corresponding tongue-piece, the latter is shifted, thereby allowing it to enter the hole which was covered by the tongue-piece, and thus permits the carriage to continue its travel until the other screw encounters in its turn the tongue-piece which serves as a stop thereto. One arm of a two-armed lever O, which has its fulcrum on the base A, bears against a projection O' on the carriage C, so that when this lever is turned into the position shown by dotted lines in Fig. 1, the cutter N is brought into position for working—say, for instance, to cut the point of the arbor being worked. The bevel to be produced is determined at will by means of the screw $w'$. The position of the carriage $c'$ on its slide is determined by the set-screws $r'\ r^2$. When it is required to disconnect the cutter N, the stud $o'$ can be caught by the hooked lever $o$ of the carriage C. A two-armed lever P, having its fulcrum on the base-plate A, serves to shift the carriage C in a like manner to that explained with reference to the lever O. When the lever P is turned into the position shown by dotted lines in Fig. 1, (the lever O being supposed to be in the position shown by full lines,) the carriage C is so shifted that the burnisher M is brought into position for acting upon the work. The lever P bears against one extremity of the detent P', pivoted to the carriage C, the other extremity being actuated by a set-screw $P^\times$, which admits of the detent P' being shifted, and therefore permits of accurately adjusting the position given to the carriage C by the lever P.

An arm S, pivoted at S' to the base A, is provided with two set-screws $s'\ s^2$, which bear against the tongue-pieces $t'\ t^2$ of a stop T, fixed to C. The free end of this arm S bears against a plate $S^\times$, pivoted to the carriage B. A screw $s^\times$, traversing a slot in the plate $S^\times$, allows of this latter being placed more or less at an angle. When the plate $S^\times$ is set straight, as shown in the drawings, its action on the lever S is nil; but when it is set at an angle it progressively pushes the point of the lever S in proportion as the carriage B advances to the left, and the lever S in its turn displaces the carriage C by means of the set-screws $s'\ s^2$ and support T. Hence the cutter is moved parallel to its axis in proportion as the work advances parallel to its axis—that is to say, the cutter produces a cone or bevel whose inclination is determined by the position into which the plate $S^\times$ has been set. The cranked lever U, which is pivoted at the base A, may also be put into motion for the cutting of the bevels. For this purpose it is only necessary to set the stop X by means of the handle Y into the position shown by Figs. 1 and 2. This stop then strikes one of the arms of the lever U and pushes it in proportion as the carriage B advances, thereby producing a progressive backward movement of the carriage C, the other arm of the lever U bearing against the screw V, which passes through a support $v$, fixed to the carriage C. To throw the stop X out of action it is only necessary to turn the handle Y ninety degrees, as indicated by the arrow in Fig. 2.

Having thus described my invention, I claim—

1. The improved pivot-lathe for forming and polishing cylindrical parts, short rods, shoulders, bevels, &c., on arbors or moving parts used in watches, clocks, musical boxes, and other like mechanism having its parts constructed, arranged, combined, and operating substantially as hereinbefore described and shown.

2. In a pivot-lathe for the class of work set forth, the combination of the carriage B, carrying the work, and the carriage C, carrying the several tools for acting successively on the said work, substantially as described.

3. In a pivot-lathe for forming and polishing cylindrical parts, short rods, shoulders, bevels, &c., the combination of the screw-spindle G with the worm-wheel $F^\times$ and the worm F', driven by gearing, substantially as described.

4. In a pivot-lathe for forming and polishing cylindrical parts, short rods, shoulders, bevels, &c., the combination of the coupling-box $g^\times$ with the lever $h$ and the bolt $h^\times$, substantially as described and shown.

5. In a pivot-lathe for forming and polishing cylindrical parts, short rods, shoulders, bevels, &c., the combination, with the pin $g$, of the spindle G, with the automatic disengaging arrangement $n$, substantially as and for the purpose described.

6. In a pivot-lathe for forming and polishing cylindrical parts, short rods, shoulders, bevels, &c., the hollow spindle I', with tube $I^2$, interior spindle I, clutch J, key J', and nut $I^\times$, substantially as described and shown, and for the purpose specified.

7. In a pivot-lathe for forming and polishing cylindrical parts, short rods, shoulders, bevels, &c., the combination of the carriage C with the cutting-tool L', substantially as described.

8. In a pivot-lathe for forming and polishing cylindrical parts, short rods, shoulders, bevels, &c., the combination of the carriage C with the cutting-tool N, substantially as described.

9. In a pivot-lathe for forming and polishing cylindrical parts, short rods, shoulders, bevels, &c., the combination of the carriage C with the burnisher M, substantially as described.

10. The combination, in a lathe for turning and polishing pivots, of a rotating chuck for holding the article, mechanism, substantially as specified, for moving the same axially and progressively, turning and polishing tools and their supporting-heads, and mechanism for moving the same progressively toward the axis of rotation of the article operated upon, substantially as specified.

11. The combination, in a lathe for turning and polishing pivots and similar articles, of a rotary chuck for the article, a moving bed for supporting the same, a turning-tool and a polishing-tool, automatic mechanism, substantially as specified, for moving the parts successively, and stopping mechanism for disconnecting the power as the operation is completed, substantially as specified.

12. In a pivot-lathe for forming and polishing cylindrical parts, short rods, shoulders, bevels, &c., the lever S, in combination with the stop T of the carriage C and the plate S$^\times$ of the carriage B, substantially as described, and for the purpose specified.

13. In a pivot-lathe for forming and polishing cylindrical parts, short rods, shoulders, bevels, &c., the combination of the stop X with the bent lever U, pivoted to the carriage B, and with the screw V, carried by the carriage C, substantially as described, and for the purpose indicated.

In testimony whereof I have signed my name to this specification in the presence of two subscribing witnesses.

JAKOB SCHWEIZER. [L. S.]

Witnesses:
H. LABHART,
A. C. THOMANN.